March 19, 1968 J. F. TAPLIN 3,373,694
CYLINDER AND PISTON UNIT HAVING NON-COLLAPSIBLE
DUAL ROLLING DIAPHRAGM
Filed Oct. 21, 1965
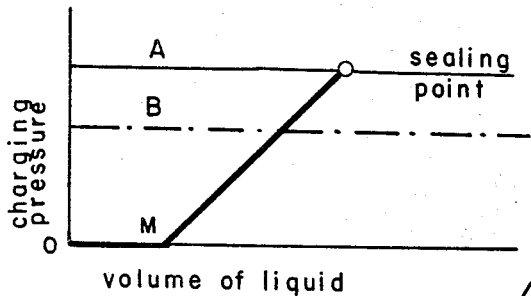
FIG. 1
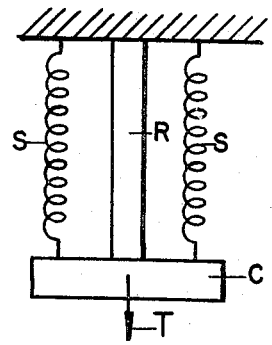
FIG. 2
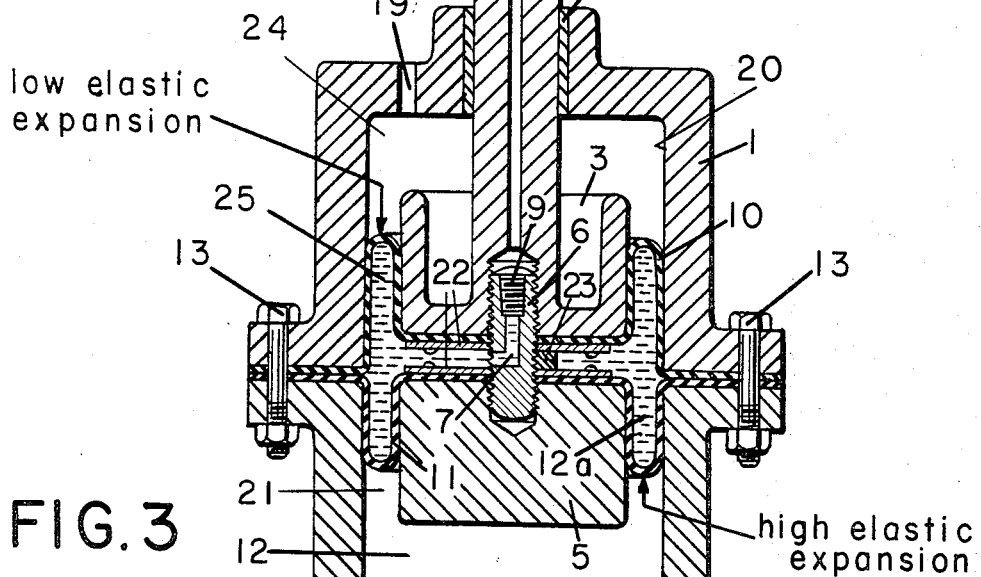
FIG. 3
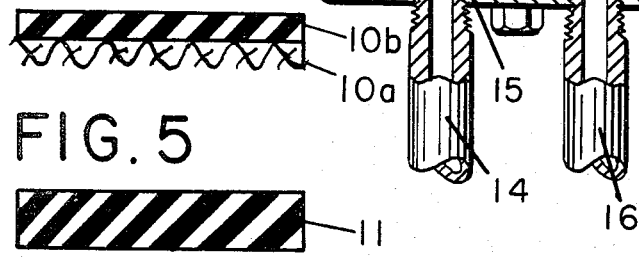
FIG. 4
FIG. 5
INVENTOR:
JOHN F. TAPLIN
By  Atty.

United States Patent Office 3,373,694
Patented Mar. 19, 1968

3,373,694
CYLINDER AND PISTON UNIT HAVING NON-COLLAPSIBLE DUAL ROLLING DIAPHRAGM
John F. Taplin, 15 Sewall St.,
West Newton, Mass. 02165
Filed Oct. 21, 1965, Ser. No. 499,570
12 Claims. (Cl. 103—150)

ABSTRACT OF THE DISCLOSURE

Disclosed below is a long-stroke-type reciprocating piston pump including rolling diaphragm means, i.e. diaphragm means having a rolling wall which rolls off the piston onto the cylinder when the piston is moved in one direction, and which rolls off the cylinder onto the piston when the latter is moved in the opposite direction. Such piston pumps are subject to pressure reversal and consequent collapse of the rolling diaphragm, tending to damage the latter. The piston pump disclosed below includes effective means precluding pressure reversal and collapse of the rolling diaphragm.

---

This invention relates to cylinder and piston units having rolling diaphragm means, and more particularly to cylinder and piston units having deep drawn rolling diaphragm means and being adapted for use as piston pumps for fluid media.

In order for such devices to properly perform the pressure to one side of its rolling diaphragm must always be larger than on the other side thereof. The term pressure reversal refers to a situation not meeting with the above pre-requisite for proper operation. Pressure reversal may result in collapse of the rolling diaphragm which, in turn, renders the device inoperative.

It is, therefore, one object of this invention to provide rolling diaphragm devices, and more particularly rolling diaphragm piston pumps, which are not subject to pressure reversal and collapse of their rolling diaphragm.

In rolling diaphragm devices pressure reversal and collapse of the rolling diaphragm can be effectively precluded by evacuating the space on one side of the rolling diaphragm. This may involve the provision of more or less complex auxiliary equipment.

It is, therefore, another object of this invention to provide rolling diaphragm devices, and more particularly rolling diaphragm piston pumps, not subject to pressure reversal and collapse of their rolling diaphragm, wherein this end is achieved without resorting to vacuum producing means such as, for instance, an auxiliary vacuum pump.

In a rolling diaphragm piston pump, or a similar device, the danger of pressure reversal and collapse of a rolling diaphragm increases in proportion to the partial vacuum established to one side of the rolling diaphragm during a suction stroke of the piston. Because of this fact it does not follow from the presence of vacuum producing means in a given installation that these vacuum producing means lend themselves to precluding pressure reversal and collapse of a rolling diaphragm of a given piston pump in that installation.

It is, therefore, another object of this invention to provide rolling diaphragm devices, and more particularly rolling diaphragm piston pumps, including integral means for precluding pressure reversal and collapse of the rolling diaphragm which can be pre-set to effectively cope with the highest partial vacuum established to one side of the rolling diaphragm during the suction stroke of the piston, irrespective whether this partial vacuum is relatively high, or relatively low.

The foregoing and other general and special objects of the invention and advantages thereof will more clearly appear from the following description of the invention as illustrated in the accompanying drawing wherein FIG. 1 is a diagram illustrating one aspect of the invention;

FIG. 2 is a diagrammatic representation of a mechanical analog of the hydraulic structure embodying this invention;

FIG. 3 is a horizontal section of a piston pump embodying this invention;

FIG. 4 is a diagrammatic cross-section of a portion of one of the rolling diaphragm structures of FIG. 3 on a much larger scale than FIG. 3; and FIG. 5 is a diagrammatic cross-section of a portion of the other of the rolling diaphragm structures of FIG. 3 drawn on the same scale as FIG. 4.

Referring now to the drawings, and more particularly to FIG. 3 thereof, reference numeral 1 has been applied to indicate the upper part of a cylinder body and reference numeral 2 has been applied to indicate the lower part of that cylinder body. Parts 1 and 2 are provided with juxtaposed flanges. Screws 13 project through the flanges of parts 1, 2 of the cylinder body and maintain these parts in the position thereof. Cylinder body 1, 2 defines a cylindrical cavity 20 accommodating a reciprocating piston body, or piston structure. The aforementioned piston body or piston structure includes an upper part 3 integral with piston rod 4 slidable in slide bearing 18 and a lower part 5. The constituent parts 3, 5 of the piston body or piston structure are held together by a screw 6 having an upper end projecting into piston part 3 and piston rod 4 and a lower end projecting into piston part 5. Screw 6 defines an angular fluid passageway 7 communicating with fluid passageway 8 which is defined by piston rod 4 and extends in a direction longitudinally thereof. Fluid passageway 7 in screw 6 is internally screw-threaded and closed or sealed-off by externally screw-threaded plug 9. Piston parts 3, 5 have an outer diameter which is less than the inner diameter of the cylindrical cavity 20 defined by cylinder body 1, 2. As a result, a toroidal gap 21 is formed between the inner surface of cylinder body 1, 2 and piston structure 3, 5. The piston pump shown in FIG. 3 further comprises a pair of rolling diaphragms or a pair of rolling diaphragm units 10, 11. Each of the two rolling diaphragm units comprises a radially outer clamping flange, a radially inner clamping flange and a rolling wall arranged in the aforementioned toroidal gap 21. The two radially outer clamping flanges of rolling diaphragms 10, 11 are juxtaposed, abut against each other and are clamped between the two flanges of the constituent parts 1, 2 of the cylinder body. The radially inner clamping flange of rolling diaphragm 10 is clamped by a clamping plate 22, or equivalent means, against the axially inner end surface of piston part 3 and the radially inner clamping flange of rolling diaphragm 11 is clamped by a clamping plate 22, or equivalent means, against the axially inner end surface of piston part 5. Clamping plates 22 may be secured to piston parts 3, 5 by screws projecting through said plates into the axially inner end surface of parts 3, 5. A spacer 23 may be arranged between clamping plates 22 to maintain a desired clearance therebetween. Upper rolling diaphragm 10 has a relatively low elastic expansion or expansibility, and rolling diaphragm 11 has a relatively high elastic expansion or expansibility. Rolling diaphragm 10 is preferably of the type disclosed and claimed in U.S. Patent 2,849,026 to John F. Taplin, issued Aug. 26, 1958 for Flexible Fluid Sealing Diaphragm. This rolling diaphragm has a limited circumferential expansibility to make it possible to adjust to the changes in diameter required when the rolling wall thereof rolls from the side wall of piston structure 3, 5 onto the side wall of cylinder body 1, 2 or, vice versa, from the side wall of cylinder body 1, 2 onto the side wall of piston structure 3, 5. The performance characteristic of limited circumferential expansibility may be achieved by providing rolling diaphragm with a pre-compressed woven insert and a fluid tight layer of an elastomer of the kind more fully set forth in U.S. Patent 2,849,026 referred-to above. Rolling diaphragm 11 should be substantially isoelastic, i.e. it should have substantially the same degree of elasticity in any direction.

The term Young's modulus is applied to indicate the ratio of stress to strain in any given material. Rolling diaphragm 10 should be of a material having a relatively large Young's modulus and rolling diaphragm 11 of a material having a relatively small Young's modulus. The term force constant is another term applied to characterize the elastic properties of a given material. It is the numerical value of the force required to produce unit elongation. The material of which rolling diaphragm 10 is made should be a material whose force constant is relatively large, and rolling diaphragm 11 should be made of a material whose force material is relatively small.

FIG. 4 is an enlarged cross-section of a portion of the rolling wall of rolling diaphragm 10 including the woven insert portion 10a and the elastomer layer portion 10b.

FIG. 5 is a cross-section of a portion of the rolling wall of rolling diaphragm 11 made of a homogeneous layer of natural or synthetic rubber and lacking a woven insert.

The two rolling diaphragms 10, 11 sub-divide the cylindrical cavity 20 defined by cylinder body 1, 2 into an upper axially outer chamber 24 maintained substantially at atmospheric pressure by venting port 19 defined by part 1, a lower axially outer chamber or pump chamber 12 and an intermediate chamber or diaphragm chamber 12a bounded by rolling diaphragms 10 and 11. Intermediate chamber or diaphragm chamber 12a is filled with a body of liquid 25 sealed-in by means of the screw-threaded plug 9.

The lower part 2 of cylinder body 1, 2 is provided with an exhaust pipe 14 under the control of a check valve 15 which opens when the pressure in pump chamber 12 exceeds the pressure in exhaust pipe 14. The lower part 2 of cylinder body 1, 2 is further provided with an intake pipe 16 under the control of a check valve 17 which opens when the pressure in pump chamber 12 is less than in intake pipe 16, which occurs during the suction stroke of piston structure 2, 3.

Diaphragm chamber 12a has a fixed volume as long as rolling diaphragms 10, 11 are not stressed. When a larger volume of liquid is filled into diaphragm chamber 12a than the aforementioned fixed volume, diaphragms 10, 11 are stressed progressively as the volume of the liquid filled into diaphragm chamber 12a is increased. The stress in diaphragms 10, 11 and the charging pressure of diaphragm chamber 12a, or the pressure prevailing in diaphragm chamber 12a, increase in proportion to the volume of liquid filled into diaphragm chamber 12a. It is, therefore, readily possible to establish in diaphragm chamber 12a a desired pressure by filling into it a predetermined amount of liquid. Diaphragm 11 expands significantly as the pressure in diaphragm chamber 12a increases, but the expansion of diaphragm 10 with increasing pressure in diaphragm chamber 12a is insignificant.

FIG. 1 is a diagrammatic plot showing the charging pressure of diaphragm chamber 12a plotted against the volume of liquid contained in it. As long as the volume of liquid filled into chamber 12a is less than OM, the pressure prevailing in chamber 12a is virtually zero. After the critical minimum volume OM is exceeded, the charging pressure of, and the internal pressure in, diaphragm chamber 12a increase in proportion to the volume of liquid filled into it.

Referring now again to FIG. 3, in order to preclude a collapse of the dual diaphragm structure 10, 11 the stresses in the rolling wall of rolling diaphragm 11 tending to contract the latter must exceed the suction resulting from the highest possible partial vacuum in pump chamber 12 tending to elongate the rolling wall of rolling diaphragm 11. In other words, the positive pressure in diaphragm chamber 12a must always numerically exceed the negative pressure, or vacuum, in pump chamber 12. There is a condition of equilibrium when the aforementioned positive pressure is numerically equal to the aforementioned negative pressure.

In FIG. 1 the horizontal line B indicates the numerical value of the highest vacuum that can be established in pump chamber 12 during the suction stroke of piston structure 3, 5 expressed in terms of lbs./in.$^2$, and the horizontal line A indicates the numerical value of the pressure expressed in terms of lbs./in.$^2$ to which diaphragm chamber 12a has been pre-charged with liquid through passageways 7, 8 before diaphragm chamber 12a was sealed-off by insertion of screw-threaded plug 9. It is apparent that the level of line A is higher than the level of line B. FIG. 1 makes it possible to read-off the volume of liquid which must be filled into chamber 12a to raise its pressure level to that of the horizontal line A. That volume is given by the ordinate of the point of intersection between horizontal line A and the sloping pressure-versus-volume characteristic. That point has been indicated in FIG. 1 as "sealing point" because at this point passageways 7, 8 are sealed-off during the manufacturing process of the device by insertion of plug 9.

FIG. 3 shows the piston structure 3, 5 in a position intermediate the two limit positions thereof. During the suction stroke of the pump, piston structure 3, 5 is moved upwardly by some appropriate drive (not shown) acting upon piston rod 4. The upward movement of piston structure 3, 5 establishes a partial vacuum, or a zone of relatively low pressure, inside of pump chamber 12. As a result check valve 17 opens and admits fluid flowing through duct 16 into pump chamber 12. Progressive increase of the partial vacuum in pump chamber 12 tends to move the convolution of rolling diaphragm 11 in downward direction. Since the elastic forces in the rolling wall of diaphragm 11 tend to pull the convolution thereof in upward direction, and since these forces exceed the forces resulting from the vacuum in pump chamber 12 tending to move the convolution of that rolling diaphragm in downward direction, no movement of the convolution of rolling diaphragm 11 can occur in downward direction. On the other hand, the convolution of the rolling wall of rolling diaphragm 11 is precluded by the incompressible nature of the body 25 of liquid in diaphragm chamber 12a from moving in upward direction. The only movement which the rolling diaphragm 11 performs during the upward or suction stroke of piston structure 3, 5 is unrolling from cylinder body 1, 2 onto the lower part 5 of piston structure 3, 5. Simultaneously the rolling wall of the upper rolling diaphragm 10 rolls off the lateral wall of the upper part of 3 of piston body 3, 5 onto the lateral wall of cylinder body 1, 2.

The play of forces in the structure of FIG. 3 may more readily be understood from a consideration of the mechanical analog shown in FIG. 2. That analog comprises a pair of helical springs S having upper ends attached to a ceiling structure and having lower ends tied together by cross-bar C. A rigid rod R is interposed between the aforementioned ceiling structure and cross-bar C, thereby stressing helical springs S. Rod R is the analog of the non-compressible liquid 25 in diaphragm chamber 12a, and the elastic forces of springs S are the analog of the elastic forces in the rolling wall of rolling diaphragm 11. The partial vacuum prevailing in pump chamber 12 may be represented by force vector T tending to move cross-bar C in downward direction. Such a movement cannot take place as long as the forces in springs S tending to clamp rod R between the above referred-to ceiling structure and cross-bar C exceed the force vector T.

The downward stroke of piston structure 3, 5 is the compression stroke of the pump resulting in an increase of pressure inside of pump chamber 12 and the outflow of fluid contained therein through check valve 15 inside of duct 14. During the compression stroke of piston structure 3, 5 the rolling wall of rolling diaphragm 10 rolls off cylinder body part 1 onto upper piston part 3 and the rolling wall of rolling diaphragm 11 rolls off lower piston part 5 onto cylinder body part 2.

The volume of diaphragm chamber 12a remains constant during the entire suction stroke and the entire compression stroke of piston structure 3, 5. The stresses in the rolling wall of rolling diaphragm 11 remain constant during the suction stroke of piston structure 3, 5.

Parts 1, 2, 3, 4, 5, 6, 9, 10 and 11 are in the shape of surfaces of solids of revolution and, therefore, FIG. 3 does not call for a top plan view or a cross-section for a full understanding thereof.

It will be apparent that the pressure in diaphragm chamber 12a always exceeds the pressure in chamber 24 and, therefore, there cannot be any question of pressure reversal and collapse of diaphragm 10.

It will be understood that I have illustrated and described herein a preferred embodiment of my invention, and that various alterations may be made in the details thereof without departing from the spirit and scope of the invention as defined in the appended claims.

I claim as my invention:

1. A rolling diaphragm device comprising in combination:
   (a) a cylinder body having an internal lateral surface;
   (b) a piston structure inside said cylinder body having axially outer end surfaces and a lateral surface spaced from said internal lateral surface of said cylinder body;
   (c) a first rolling diaphragm having a radially outer flange secured to said cylinder body, a rolling wall arranged between said internal lateral surface of said cylinder body and said lateral surface of said piston structure and a radially inner flange secured to said piston structure at a point intermediate said axially outer end surfaces thereof, said rolling wall of said first rolling diaphragm being arranged to roll off said lateral surface of said piston structure onto said internal surface of said cylinder body when said piston structure is moved in one direction, and said rolling wall of said first rolling diaphragm being arranged to roll off said internal surface of said cylinder body onto said lateral surface of said piston structure when said piston structure is moved in the opposite direction, and said first rolling diaphragm being of a material having a relatively low elastic expansibility and being substantially non-expansible in an axial direction;
   (d) a second rolling diaphragm having a radially outer flange secured to said cylinder body, a rolling wall arranged between said internal lateral surface of said cylinder body and said lateral surface of said piston structure and a radially inner flange secured to said piston structure at a point intermediate said axially outer end surfaces thereof, said rolling wall of said second rolling diaphragm being arranged to roll off said internal surface of said cylinder body onto said lateral surface of said piston structure when said piston structure is moved in said one direction, and said rolling diaphragm being arranged to roll off said lateral surface of said piston structure onto said internal surface of said cylinder body when said piston structure is moved in said opposite direction, and said second rolling diaphragm being of a material having a relatively high elastic expansibility, and said second diaphragm and said first diaphragm jointly bonding a substantially toroidal diaphragm chamber, said cylinder body, said piston structure and said second rolling diaphragm jointly defining a substantially closed chamber capable of maintaining a partial vacuum therein;
   (e) means for moving said piston structure inside said cylinder body and thereby establishing a predetermined partial vacuum in said substantially closed chamber; and
   (f) a body of liquid under pressure inside said diaphragm chamber, the pressure of said body of liquid establishing stresses tending to contract said second rolling diaphragm, said pressure being sufficiently high to cause said stresses to exceed the suction action of said partial vacuum on said rolling wall of said second rolling diaphragm.

2. A rolling diaphragm device as specified in claim 1 wherein said first rolling diaphragm includes a woven insert impregnated with an elastomer and wherein said second rolling diaphragm includes a substantially iso-elastic elastomeric sheet material without woven insert.

3. A rolling diaphgram device as specified in claim 1 wherein said piston structure includes a piston rod defining a passageway having two ends, one of said two ends communicating with said diaphragm chamber.

4. A rolling diaphragm device as specified in claim 1 wherein said piston structure includes a piston rod defining a first passageway extending in a direction longitudinally thereof, and wherein said piston structure further includes a pair of piston units having juxtaposed axially inner end surfaces, said pair of piston units being joined together by fastener means and said fastener means defining a second passageway communicating with said first passageway and communicating with said diaphragm chamber.

5. A rolling diaphragm device as specified in claim 1 wherein said piston structure comprises a pair of piston units having juxtaposed axially inner end surfaces and joined together by fastener means, and wherein said radially inner flange of said first rolling diaphragm and said radially inner flange of said second rolling diaphragm are both arranged between said juxtaposed axially inner end surface of said piston units.

6. A rolling diaphragm device as specified in claim 1 wherein said cylinder body includes a pair of complementary portions having juxtaposed flanges, said radially outer flange of said first rolling diaphragm and said radially outer flange of said second rolling diaphragm being clamped between said juxtaposed flanges of said complementary portions, wherein said piston structure includes a pair of piston units having juxtaposed axially inner end surfaces, and wherein said radially inner flange of said first rolling diaphragm and said radially inner flange of said second rolling diaphragm are arranged between said axially inner end surfaces of said pair of piston units and each clamped against one of said pair of axially inner end surfaces of said pair of piston units.

7. A rolling diaphragm device as specified in claim 1 wherein said piston structure includes a pair of piston units having juxtaposed axially inner end surfaces, said pair of piston units being held together by a screw-threaded stud coaxial with said pair of piston units and defining a passageway communicating with said diaphragm chamber.

8. A piston pump comprising in combination:
   (a) a cylinder body defining a cylindrical cavity having a predetermined inner diameter;
   (b) a piston structure having a smaller outer diameter than said predetermined inner diameter arranged inside said cylindrical cavity and leaving a toroidal gap between said cylinder body and said piston structure;
   (c) a fluid admission duct controlled by a first check valve for admitting fluid to said cylindrical cavity;
   (d) a fluid exhaust duct controlled by a second check valve for exhausting fluid from said cylindrical cavity;

(e) a double walled rolling diaphragm structure including a first rolling diaphragm having a first radially outer clamping means secured to said cylinder body, a first rolling wall positioned in said toroidal gap and a first radially inner clamping means secured to said piston structure, said rolling diaphragm structure further including a second rolling diaphragm having a second radially outer clamping means secured to said cylinder body, a second rolling wall positioned in said toroidal gap and a second radially inner clamping means secured to said piston structure, said first rolling wall and said second rolling wall being arranged in said toroidal gap in such a way that said first rolling wall rolls off said piston structure onto said cylinder body as said second rolling wall rolls off said cylinder body onto said piston structure and that said first rolling wall rolls off said cylinder body onto said piston structure as said second rolling wall rolls off said piston structure onto said cylinder body, said first rolling diaphragm having a high and said second rolling diaphragm having a low elastic expansibility and said second rolling diaphragm being substantially non-expansible in axial direction;

(f) operating means for reciprocating said piston structure inside said cylindrical cavity imparting to said piston structure strokes of predetermined length and thereby establishing a predetermined partial vacuum inside said cylindrical cavity; and (g) a sealed-off body of liquid inside of a space bounded by said double walled rolling diaphragm structure maintained at a pressure establishing stresses in said second rolling wall of said second rolling diaphragm tending to contract said rolling wall, and said pressure being sufficiently high to cause said stresses to exceed the suction action of said partial vacuum on said second rolling wall of said second rolling diaphragm.

9. A piston pump as specified in claim 8 wherein said double walled rolling diaphragm structure includes a pair of complementary rolling diaphragm units having juxtaposed radially outer flanges and juxtaposed radially inner flanges arranged in parallel planes, and wherein one of said pair of rolling diaphragm units has a rolling wall having a limited circumferential extensibility and being virtually non-extensible in axial direction, and wherein the other of said pair of rolling diaphragm units has a rolling wall having a relatively high extensibility which is substantially equal in any direction.

10. A piston pump as specified in claim 9 wherein one of said pair of rolling diaphragm units has a rolling wall including a woven insert and a layer of an elastomer, and wherein the other of said pair of rolling diaphragm units has a rolling wall including a layer of an elastomer without woven insert.

11. A piston pump as specified in claim 8 wherein said operating means include a piston rod having one end fixedly secured to said piston structure and slidably supported in a bearing integral with said cylinder body, said piston rod defining a passageway extending in a direction longitudinally thereof for filling said body of liquid into said space bounded by said double walled rolling diaphragm.

12. A piston pump comprising in combination:
(a) a cylinder body defining a cylindrical cavity having a predetermined inner diameter;
(b) a piston structure having a smaller outer diameter than said predetermined inner diameter arranged inside said cylindrical cavity leaving a toroidal gap between said cylinder body and said piston structure;
(c) operating means for reciprocating said piston structure inside said cylindrical cavity;
(d) a pair of rolling diaphragm units having juxtaposed radially outer flanges and juxtaposed radially inner flanges arranged in parallel planes, one of said pair of rolling diaphragm units having a rolling wall including a layer of an elastomer and a woven insert making said one of said pair of rolling diaphragm units substantially non-expansible in axial direction and the other of said pair of rolling diaphragm units having a rolling wall including a substantially iso-elastic layer of an elastomer without woven insert, said pair of rolling diaphragm units subdividing said cylindrical cavity into a first axially outer chamber bounded by said rolling wall of said one of said pair of rolling diaphragm units, a second axially outer chamber bounded by said rolling wall of said other of said pair of rolling diaphragm units, and an axially inner chamber bounded on one side thereof by said rolling wall of said one of said pair of rolling diaphragm units and bounded on the other side thereof by said rolling wall of said other of said pair of rolling diaphragm units;
(e) a fluid admission duct communicating with said second axially outer chamber and being controlled by a first check valve;
(f) a fluid exhaust duct communicating with said second axially outer chamber and being controlled by a second check valve; and
(g) a sealed-off body of liquid under pressure inside said axially inner chamber establishing stresses in said other of said rolling diaphragm units, said pressure being sufficiently high to cause said stresses to exceed the suction action in said second axially outer chamber on said other of said pair of rolling diaphragm incident to admission of fluid through said fluid admission duct.

References Cited

UNITED STATES PATENTS

| | | | |
|---|---|---|---|
| 2,376,475 | 5/1945 | Bush | 92—99 |
| 2,685,304 | 8/1954 | Wright | 92—100 |
| 2,751,850 | 6/1956 | Hoover | 92—100 X |
| 2,864,258 | 12/1958 | Klinger | 74—18.2 |
| 3,012,546 | 12/1961 | Heintzmann | 92—98 X |
| 3,039,443 | 6/1962 | Hay | 92—97 X |
| 3,208,394 | 9/1965 | Taplin | 103—150 |
| 3,314,594 | 4/1967 | Reitdijk | 230—21 |

FOREIGN PATENTS

| | | |
|---|---|---|
| 456,103 | 11/1926 | Germany. |
| 961,750 | 6/1964 | Great Britain. |

DONLEY J. STOCKING, *Primary Examiner.*

W. L. FREEH, *Assistant Examiner.*